United States Patent
Tan

(10) Patent No.: US 8,820,358 B2
(45) Date of Patent: Sep. 2, 2014

(54) CHECK VALVE

(75) Inventor: Changlin Tan, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 356 days.

(21) Appl. No.: 13/203,206

(22) PCT Filed: Feb. 25, 2009

(86) PCT No.: PCT/US2009/035167
§ 371 (c)(1),
(2), (4) Date: Nov. 7, 2011

(87) PCT Pub. No.: WO2010/098750
PCT Pub. Date: Sep. 2, 2010

(65) Prior Publication Data
US 2012/0048412 A1 Mar. 1, 2012

(51) Int. Cl.
*F16K 15/14* (2006.01)
*B41J 2/175* (2006.01)

(52) U.S. Cl.
CPC ........... *B41J 2/17596* (2013.01); *F16K 15/148* (2013.01)
USPC ........................................................ 137/854

(58) Field of Classification Search
CPC .................................................. F16K 15/148
USPC .................................................... 137/854
See application file for complete search history.

(56) References Cited

U.S. PATENT DOCUMENTS

| 3,473,561 | A | | 10/1969 | Svenson et al. | |
|---|---|---|---|---|---|
| 4,640,293 | A | * | 2/1987 | Garbe | 600/529 |
| 5,375,621 | A | | 12/1994 | Gaehwiler | |
| 6,267,473 | B1 | | 7/2001 | Smith | |
| 6,516,829 | B1 | * | 2/2003 | Townsend et al. | 137/517 |
| 6,827,105 | B1 | * | 12/2004 | Marble et al. | 137/854 |
| 2006/0021994 | A1 | * | 2/2006 | Masuda | 222/92 |
| 2006/0260703 | A1 | * | 11/2006 | Johnson | 137/854 |

FOREIGN PATENT DOCUMENTS

WO 2006074511 A1 7/2006

OTHER PUBLICATIONS

European search report in counterpart European patent application 09840910.5, dated Sep. 28, 2012.

* cited by examiner

*Primary Examiner* — Stephen M Hepperle
*Assistant Examiner* — Hailey K Do

(57) ABSTRACT

A check valve including a cylindrical valve well defining a chamber, a valve disk, a pin centrally connecting the valve well to the valve disk; the valve disk being axially symmetrically positioned with respect to the valve well. The valve disk forms a fluid seal with an annular rim of the valve well when a first pressure acting on the valve disk is greater that a opposing second pressure within the chamber. The check valve further includes a plurality of vanes disposed within the chamber, where the vanes prevent the valve disk from collapsing into the chamber due to an excessive first pressure on the valve disk.

12 Claims, 3 Drawing Sheets

CHECK VALVE

BACKGROUND

The present disclosure relates generally to check valves and more particularly to a check valve utilized in a printing device.

Check valves are widely used in industries for controlling the flow of fluids. They are frequently used together with a variety of mechanical pumps to prevent back flow of fluids from the pump to the fluid original supply. Use of check valves in this manner ensures that sudden changes in pressure at a delivery end of the pump does not result in contamination of the fluid supply. Check valves of the variety which utilizes a valve disk are simple in design and widely used in printing devices. However, due to their simple design, they are often prone to failure when subjected to excessive pressures.

BRIEF DESCRIPTION OF THE DRAWINGS

For a detailed description of exemplary embodiments of the invention, reference will now be made to the accompanying drawings in which.

DETAILED DESCRIPTION

Figure 1:
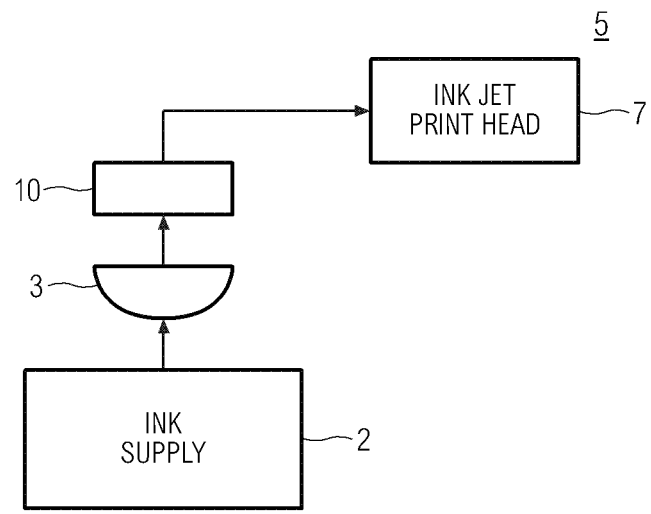
FIG. 1 illustrates a block diagram of a simplified system deploying a prior art check valve.

An embodiment of a simplified printing system 5 such as an inkjet printer is generally depicted in FIG. 1. The simplified printing system 5 generally comprises an ink supply 2, and an ink jet print head 7. Ink is delivered to the ink jet print head 7 by a pump 3 drawing ink from the ink supply 2. The pump 3 may be any of a variety of mechanical or electromechanical pumps and can be a generic diaphragm pump. A check valve 10 prevents any ink pumped out from the pump 3 from flowing back into and contaminating the ink supply 2.

Figure 2:
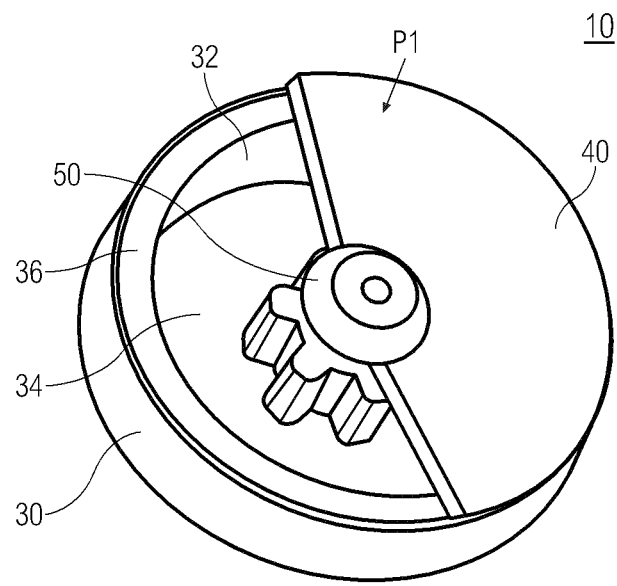
FIG. 2 shows a partially cross-sectioned prior art check valve.

FIG. 2 shows an example of a general prior art check valve 10. Such a check valve 10 comprises a cylindrical valve well 30, a circular valve disk 40 and a pin 50. The pin 50 serves to connect the valve disk 40 securely to the valve well 30.

The valve well 30 includes an internal wall 32 and an internal floor 34. The internal wall 32 and the internal floor 34 in combination defines a chamber of the valve well 30.

The valve disk 40 is axially symmetrically positioned with respect to the valve well 30 and is kept in position by the pin 50.

When a pressure P1 which is greater than an opposing pressure in the chamber, is exerted on the valve disk 40, the valve disk 40 is actively in a closed position. In the closed position, the valve disk 40 is seated on an annular rim 36 of the valve well 30. The valve disk 40 in the closed position forms a fluid seal with the annular rim 36. This prevents any fluid in the chamber of the valve well from escaping via spaces between the valve well 30 and the valve disk 40.

The valve disk 40 is formed from a flexible resiliently deformable material and is of a larger diameter than the annular rim 36. When pressure P1 is the same as the pressure in the chamber, the valve disk 40 is passively in a closed position and seated on the annular rim 36.

In operation, when P1 is lower than the opposing pressure in the chamber of the valve well 30, the valve disk 40 is actively in an open position. The valve disk 40 flexes away from the annular rim 36 of the valve well 30 allowing fluid to escape via space between the valve disk 40 and the annular rim 36 of the valve well 30.

Figure 3:
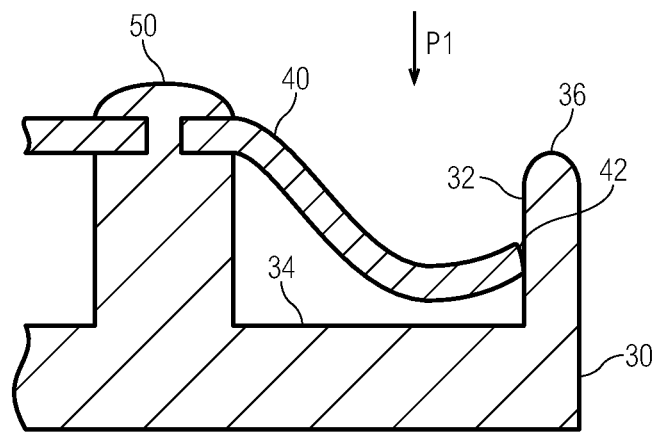
FIG. 3 shows a side view of a cross sectioned prior art check valve.

In FIG. 3, when pressure P1 on the valve disk 40 is excessively high, the valve disk 40 being made from a flexible resiliently deformable material may flex inwards into the chamber of the valve well 30. If the pressure P1 is too high, a portion of the valve disk 40 may flex to a point where that portion of the valve disk 40 collapses into the chamber of the valve well 30 as shown in FIG. 3.

While the valve disk 40 is generally designed to have a greater diameter than the annular rim 36, excessive pressure P1 on the valve disk 40 causes it to flex until the edge 42 of the valve disk 40 collapses into the chamber. In addition to the edge 42 of the valve disk 30 collapsing into the chamber, the edge 42 is further caught up against the internal wall 32. This further prevents the valve disk 40 from recovering to its uncollapsed position. Such a collapse of the valve disk 40 can be catastrophic as no amount of corresponding pressure will be able to restore the valve disk 40 to its uncollapsed condition.

Figure 4:
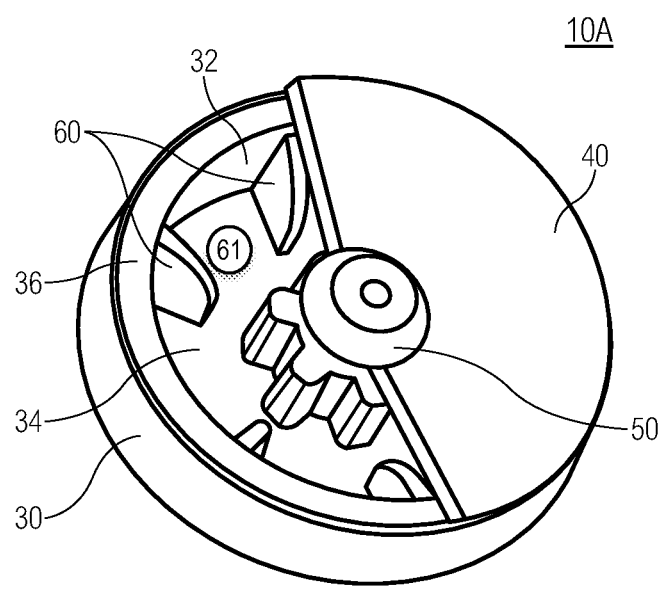
FIG. 4 shows a partially cross-sectioned check valve of a present embodiment.

FIG. 4 shows a check valve 10A in accordance with a present embodiment. The check valve 10A similarly comprises a cylindrical valve well 30, a circular valve disk 40 and a pin which connects the valve disk 40 to the valve well 30. The valve well 30 includes an internal wall 32 and an internal floor 34 which in combination defines a chamber. A fluid inlet 61 is defined on the internal floor 34. The valve disk 40 is similarly axially symmetrically positioned with respect to the valve well 30 and is kept in position by the pin 50.

The check valve 10A further comprises a plurality of vanes 60 disposed within the chamber of the valve well 30.

The vanes 60 extend radially from a circumference of the internal well 32 into the chamber of the valve well 30. The vanes 60 are substantially arranged in a well spaced out manner along the circumference. In an example, the number of vanes may number between 3 to 6.

Figure 5:
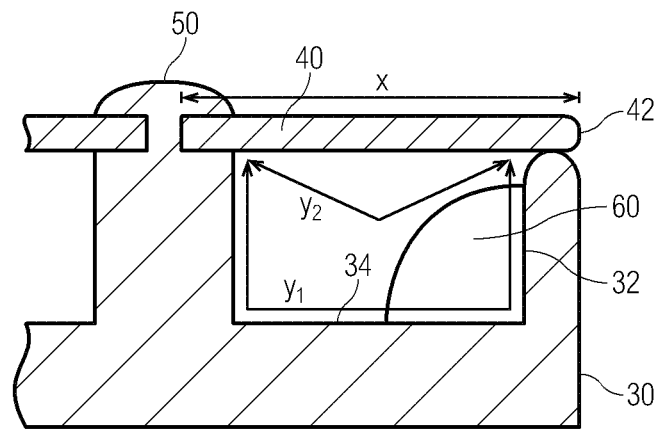
FIG. 5 shows a side view of a cross sectioned check valve of a present embodiment.

In FIG. 5, the vanes 60 when viewed from a side view are substantially in a convex configuration and extend from the internal wall 32 to the internal floor 34. The convex configuration is not a limitation and those skilled in the art will appreciate that the vanes may be practised in a variety of configurations.

The valve disk 40 typically has a diameter which is greater than the diameter of the annular rim 36. This feature helps to prevent the valve disk 40 from collapsing into the chamber. However in the event excessive pressure is encountered, the valve disk 40 may still collapse into the chamber as shown in FIG. 3.

In FIG. 5, a profile of the valve disk 40 when in a passively closed position is represented by x. When experiencing excessive pressure, the valve disk 40 deforms and flexes to a profile represented by y2. This amount of flex is minimal and permits the valve disk 40 to recover to its original profile once the pressure eases. The profile y2 is made possible by the valve disk 40 being supported by the plurality of vanes 60. The vanes 60 are designed to minimize flexing of the valve disk into the chamber under pressure by supporting the valve disk 40 from inside the chamber.

However, in a situation where the plurality of vanes 60 is absent, the valve disk 40 may collapse to a profile as represented by y1 and as an example may be illustrated in FIG. 3. With a collapse to a profile of y1, the valve disk 40 may be damaged and will unlikely to recover to its earlier profile of x.

Figure 6:
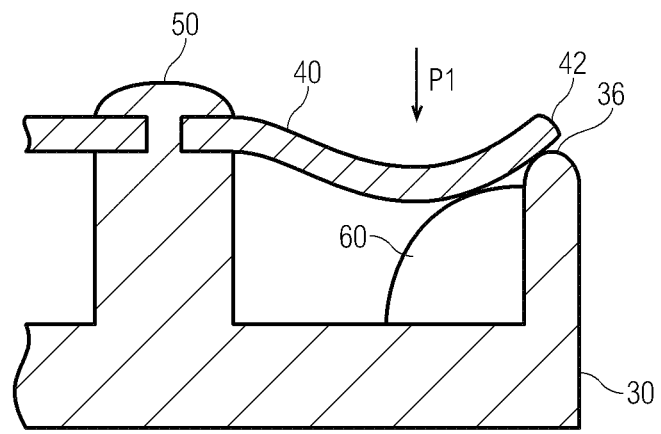
FIG. 6 shows a side view of a cross sectioned check valve of a present embodiment.

The plurality of vanes 60 in the check valve 10A of the embodiment, prevents the valve disk 40 from collapsing into the chamber. In FIG. 6, even with excessive pressure P1 on the valve disk 40, the valve disk 40 is supported by the vanes 60 from inside the chamber and slides on the vanes 60 but cannot collapse into the chamber. In particular, the edge 42 of the valve disk 40 is further prevented from collapsing into the chamber or from getting caught on the internal wall 32 of the valve well 30.

Numerous variations and modifications will become apparent to those skilled in the art once the above disclosure is fully appreciated. In addition, certain additional operational details and features of the check valve 10 known to those skilled in the art which do not have bearing on the current embodiments have not been discussed in detail.

What is claimed is:

1. A check valve, comprising:
   a cylindrical valve well having an internal wall and an internal floor which in combination defines a chamber;
   a circular valve disk;
   a pin, centrally disposed and connecting the valve well to the valve disk; the valve disk being axially symmetrically positioned with respect to the valve well;
   the valve disk forming a fluid seal with an annular rim of the valve well when a first pressure acting on the valve disk is greater than an opposing second pressure within the chamber;
   a plurality of vanes disposed within the chamber, each vane extending radially from the internal wall partially into and freely ending within the chamber towards a center of the chamber without contacting any portion of the check valve disposed within a center of the check valve, each vane extending upwards from the internal floor partially into the chamber,
   wherein the plurality of vanes is to prevent at least a portion of the valve disk from collapsing into the chamber due to an excessive first pressure on the valve disk.

2. The check valve of claim 1, wherein the plurality of vanes are substantially spaced out at regular intervals along the circumference of the valve well.

3. The check valve of claim 1, wherein the plurality of vanes provide support to the valve disk from inside the chamber when the valve disk is in a closed position.

4. The check valve of claim 1, wherein the valve disk is formed from a flexible, resiliently deformable material.

5. The check valve of claim 1, wherein the diameter of the valve disk is greater than the diameter of the annular rim.

6. The check valve of claim 1, wherein the plurality of vanes is to prevent an edge of the valve disk from collapsing into the chamber of the check valve.

7. The check valve of claim 1, wherein the plurality of vanes is designed to minimize flexing of the valve disk into the chamber due to an excessive first pressure on the valve disk.

8. A check valve, comprising:
   a cylindrical valve well having an internal wall and an internal floor, which in combination defines a chamber;
   a circular valve disk;
   a pin, centrally disposed and connecting the valve well to the valve disk; the valve disk being axially symmetrically positioned with respect to the valve well;
   the valve disk forming a fluid seal with an annular rim of the valve well when a first pressure actin on the valve disk is greater than an opposing second pressure within the chamber;
   a plurality of vanes disposed within the chamber each vane extending radially from the internal wall partially into the chamber towards a center of the chamber, each vane extending upwards from the internal floor partially into the chamber,
   wherein the plurality of vanes is to prevent at least a portion of the valve disk from collapsing into the chamber due to an excessive first pressure on the valve disk,
   wherein each vane is a quarter round in shape and has a first flat surface, a second flat surface, a round surface, a first corner, a second corner, and a third corner, the first flat surface adjoining the internal wall, the second flat surface adjoining the internal floor, the round surface within the chamber, the first flat surface and the second flat surface ending at the first corner where the internal wall meets the internal floor, the first flat surface and the round surface ending at the second corner at the internal wall, the second flat surface and the round surface ending at the third corner at the internal floor.

9. The check valve of claim 8, wherein the plurality of vanes provide support to the valve disk from inside the chamber when the valve disk is in a closed position.

10. The check valve of claim 8, wherein the valve disk is formed from a flexible, resiliently deformable material.

11. The check valve of claim 8, wherein the plurality of vanes is to prevent an edge of the valve disk from collapsing into the chamber of the check valve.

12. The check valve of claim 8, wherein the plurality of vanes is designed to minimize flexing of the valve disk into the chamber due to an excessive first pressure on the valve disk.

* * * * *

UNITED STATES PATENT AND TRADEMARK OFFICE
CERTIFICATE OF CORRECTION

Page 1 of 1

PATENT NO. : 8,820,358 B2
APPLICATION NO. : 13/203206
DATED : September 2, 2014
INVENTOR(S) : Changlin Tan It is certified that error appears in the above-identified patent and that said Letters Patent is hereby corrected as shown below:

In the Claims

In column 4, line 16, in Claim 8, delete "actin" and insert -- acting --, therefor.

In column 4, line 19, in Claim 8, delete "chamber" and insert -- chamber, --, therefor.

Signed and Sealed this
Twenty-fourth Day of March, 2015

Michelle K. Lee
*Director of the United States Patent and Trademark Office*